United States Patent [19]
Gammill

[11] Patent Number: 5,903,975
[45] Date of Patent: May 18, 1999

[54] CYLINDER HEAD STRAIGHTENING METHOD

[76] Inventor: Charles Gammill, 1637 Pear La., Greenville, Miss. 38701

[21] Appl. No.: 08/876,405

[22] Filed: Jun. 6, 1997

Related U.S. Application Data

[60] Provisional application No. 60/020,454, Jun. 18, 1996.
[51] Int. Cl.⁶ .................................................. B23P 15/00
[52] U.S. Cl. ................................... 29/888.06; 29/888.011
[58] Field of Search ................. 72/342, 454; 29/888.06, 29/888.011

[56] References Cited

U.S. PATENT DOCUMENTS

| | | | |
|---|---|---|---|
| 402,102 | 4/1889 | Paterson . | |
| 3,535,906 | 10/1970 | Swick et al. | 72/342 |
| 3,852,990 | 12/1974 | Sparling | 72/342 |
| 3,967,486 | 7/1976 | Takase et al. | 72/69 |
| 4,545,101 | 10/1985 | Hilts | 29/888.06 |
| 4,838,069 | 6/1989 | Walker et al. | 72/342 |
| 5,433,800 | 7/1995 | Bishop | 148/510 |

*Primary Examiner*—Irene Cuda
*Attorney, Agent, or Firm*—Zackery Legal Group

[57] ABSTRACT

Provided in accordance with the present invention, is a preferred embodiment of a method for straightening a warped cylinder head (10). The method initially includes placing the cylinder head in a press (12). Thereafter, the press is operated to apply a first pressure, substantially along the longitudinal axis of the cylinder head. Next, the method includes heating the cylinder head to increase the applied pressure to a second pressure, greater than the first pressure. The method then includes cooling the cylinder head until the applied pressure decreases to a third pressure less than the second pressure. The method thereafter includes operating the press to reduce pressure applied to the cylinder head to a fourth pressure, less than the first pressure. Preferably, the method includes maintaining the cylinder head at approximately the fourth pressure, while allowing the cylinder head to cool to ambient temperature. Once the cylinder head has cooled to ambient temperature, the method includes removing the cylinder head from the press.

18 Claims, 2 Drawing Sheets

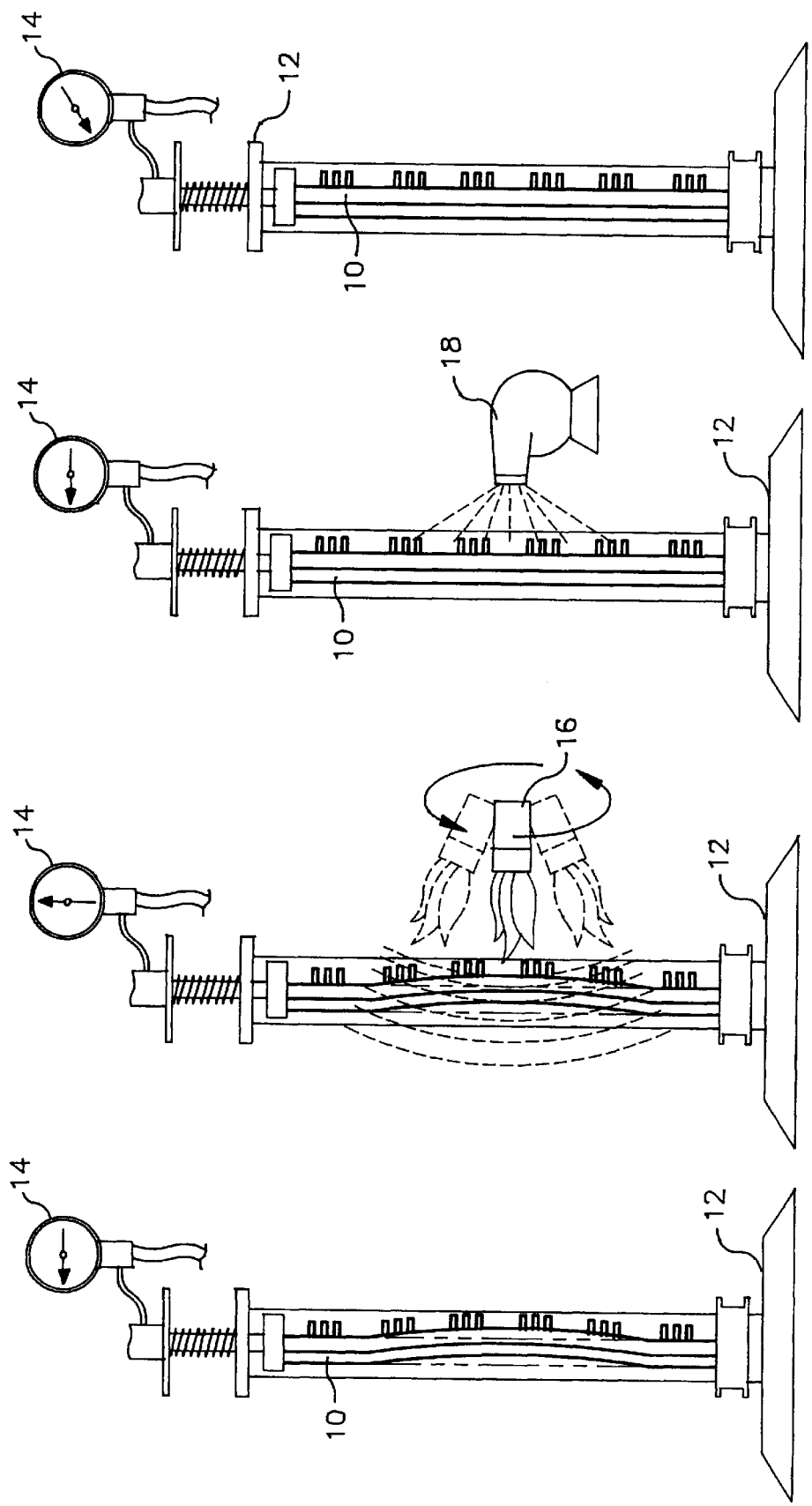

CYLINDER HEAD STRAIGHTENING METHOD

CROSS-REFERENCE TO RELATED APPLICATION

This application claims the benefit of U.S. Provisional Application Ser. No. 60/020,454, filed Jun. 18, 1996.

FIELD OF THE INVENTION

The present invention relates generally to methods for straightening warped metal articles, and in particular to methods for straightening warped cylinder heads.

BACKGROUND OF THE INVENTION

Warpage in a cylinder head frequently requires replacement of the head, which is an expensive engine component. If the warpage is minor, engine repair technicians often mill the surface of the head flat to reduce warp to an acceptable level and reuse the head. With greater warpages though, milling is not practical and the head must be replaced. Specifically, with greater warpages, cylinder heads usually do not have sufficient thickness to permit removal of the amount of material required to reduce warp to an acceptable level.

There have been past attempts at repairing warped cylinder heads without the use of milling. For example, U.S. Pat. No. 3,535,906 to Swick et al. discloses a method that includes subjecting a warped cylinder head to heat and pressure for reducing warpage. While perhaps satisfactory for some uses, the method disclosed in this patent has been found ineffective for reducing warpage to an acceptable level in most cylinder heads.

The present invention provides an effective, significantly improved method for repairing warped cylinder heads without the use of milling.

SUMMARY OF THE INVENTION

Provided in accordance with the present invention, is a preferred embodiment of a method for straightening a warped cylinder head. The method initially includes placing the cylinder head in a press.

Thereafter, the press is operated to apply a first pressure, substantially along the longitudinal axis of the cylinder head. The method then includes heating the cylinder head to increase the applied pressure to a second pressure, greater than the first pressure. Heating causes the applied pressure to increase due to thermal expansion of the cylinder head.

Next, the method includes cooling the cylinder head. Cooling continues until the applied pressure decreases to a third pressure less than the second pressure. The cooling acts to reduce the applied pressure by decreasing thermal expansion of the cylinder head, caused by the heating step.

The method thereafter includes operating the press to reduce pressure applied to the cylinder head to a fourth pressure, less than the first pressure. Preferably, the method includes maintaining the cylinder head at approximately the fourth pressure, while allowing the cylinder head to cool to ambient temperature. Once the cylinder head has cooled to ambient temperature, the method includes removing the cylinder head from the press.

The heating step preferably increases the applied pressure (the second pressure) to no more than approximately 14% greater than the first applied pressure. Additionally, the heat is directed only towards the convexly curved side the cylinder head.

The cooling step includes directing a fluid across the cylinder head. Cooling preferably continues until the applied pressure decrease to approximately the first pressure. That is, the third pressure approximately equals the first pressure.

The final pressure (the fourth pressure) that the cylinder head is maintained at while cooling to ambient temperature, is preferably within a certain range. Specifically, the fourth pressure is preferably at least 5% less than the first pressure, but is at least 80% of the first pressure.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2A illustrates a partial, schematic side view of the press of FIG. 1, with the cylinder head placed in the press, with the press being used to apply a first pressure to the cylinder head;

FIG. 2B illustrates a partial, schematic side view of the press of FIG. 1, with the cylinder head placed in the press, showing heating being applied to the cylinder head to increase the pressure applied to the cylinder head by the press;

FIG. 2C illustrates a partial, schematic side view of the press of FIG. 1, with the cylinder head placed in the press, showing cooling being applied to the cylinder head to decrease the pressure applied to the cylinder head by the press; and FIG. 2D illustrates a partial, schematic side view of the press of FIG. 1, with the cylinder head placed in the press, showing the cylinder head being maintained at a reduced pressure until the cylinder head cools to substantially ambient temperature.

DETAILED DESCRIPTION OF THE PREFERRED EMBODIMENT

Figure 1:
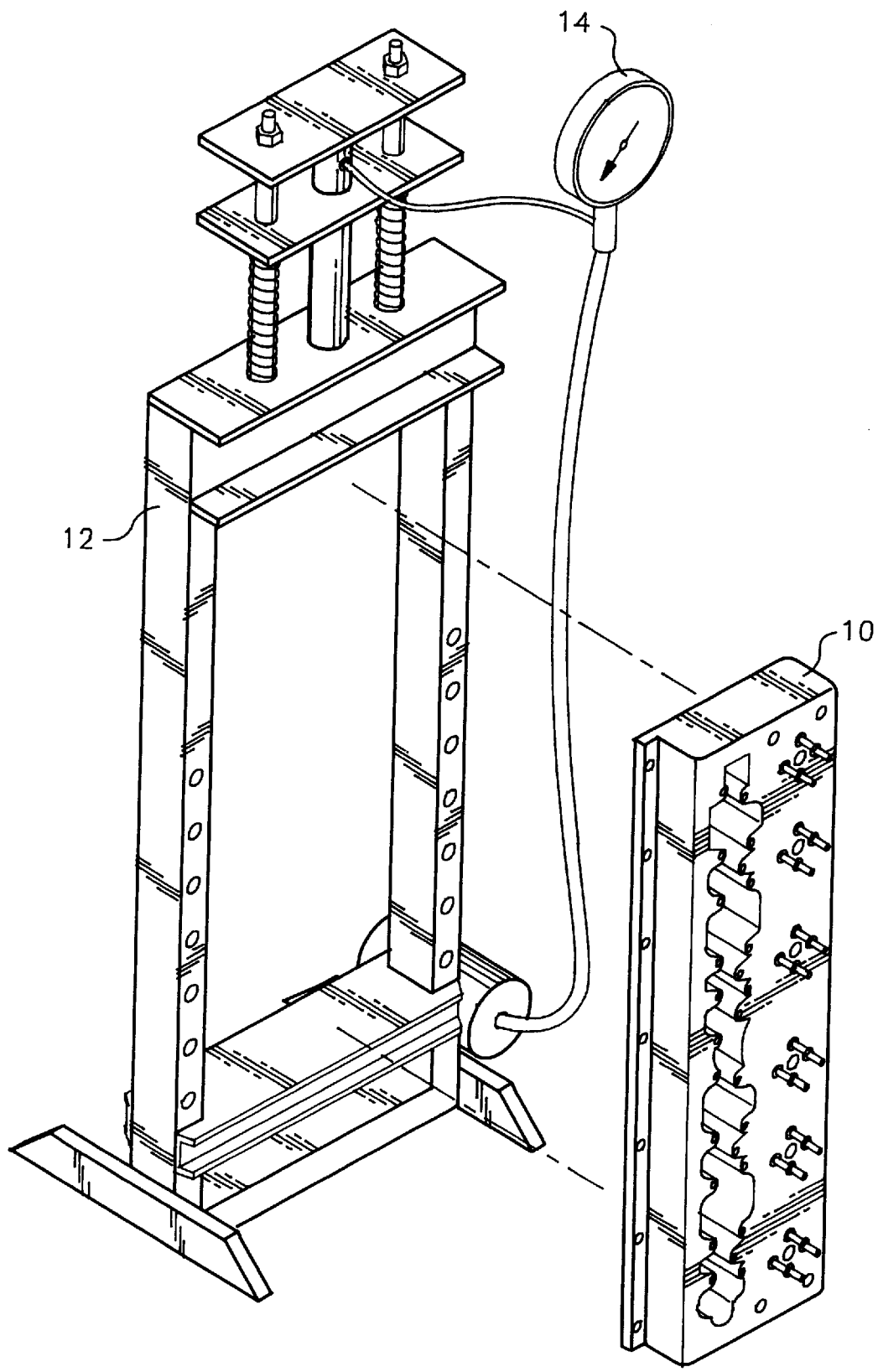
FIG. 1 illustrates a perspective view of a cylinder head, and a press for removing warpage from the head, in a method according to a preferred embodiment of the present invention.

FIG. 1 illustrates a cylinder head 10 and a press 12 for removing warpage from the head pursuant to a method in accordance with a preferred embodiment of the present invention. The method initially includes placing the cylinder head 10 in the press 12 with the head oriented so that the press 12 can be used to apply pressure along the head's longitudinal axis. The press 12 is preferably a conventional hydraulic press of a type suitable for receiving the cylinder head 10 in a vertical orientation as shown in FIG. 1. The vertical orientation facilitates convenient access to either side of the head 10 as required by the steps of the present method as discussed in greater detail below. Nevertheless, the press 12 may be any conventional type of press, e.g., pneumatic press, hydraulic, or other type, suitable for applying the requisite pressure to the cylinder head 10 as described in the following paragraphs.

For cylinder heads of the type typically used in diesel engines for semi-trucks, the press 12 is used to apply a first pressure of between 4,000 and 10,000 pounds of force to the head 10, and most preferably, a pressure of approximately of 7,000 pounds of force. For other types of cylinder heads, the pressure should be adjusted proportionately according to the size and strength of the type of head. That is, less pressure should be applied to cylinder heads from smaller engines, such as light trucks, buses, or automobiles, and proportionately more pressure should be applied to stronger, more robust head types as found in heavy equipment and semi-trucks.

FIG. 2A illustrates the cylinder head 10 placed in the press 12, with the press being used to apply the first pressure to the head. For conveniently determining the amount of pressure applied to the cylinder head 10, the press 12 preferably includes a conventional gauge 14, or other conventional measuring device.

While the press 12 is applying the previously described first pressure to the head 10, the next step of the method includes heating the head as shown in FIG. 2B. This heating is preferably directed only towards the outer, convexly curved side of the warpage in the head 10. The convex warpage side will almost always be the top, or valve spring side, of the cylinder head 10, which is the side of the head facing away from the engine block when the head is attached to the engine. (Cylinder head warpage in an engine almost always occurs with the head bowing upward, convexly away from the engine block). To determine which side of a head 10 is warped convexly or concavely, a straight edge may be laid along one side of the head, with the straight edge approximately parallel to the head's length dimension. Generally, if either end of the straight edge deviates away from the surface of the head 10, that side of the head is warped convexly. If the ends of the straight edge contact the head's surface, but a section between the straight edge's ends do not, that side of the head is warped concavely.

As indicated in FIG. 1, the heat is applied to the mid-section of the head 10, across the head's width. The heating causes thermal expansion of the head 10, and thereby increases the pressure applied to the head with the press 12. Heating continues according to this step until the pressure between the head 10 and the press 12 increases by a minimum of 5% beyond the pressure applied to the head prior to heating, but should not exceed a maximum pressure increase of approximately 14%. Thus, if the press 12 initially applied a pressure of 7,000 pounds to the head 10, heating should continue until the pressure increases at least 350 pounds, but not more than 1,000 pounds. In this respect, excessive pressure increase could damage the head, such as by causing greater warpage and/or cracking.

Heating may be accomplished using almost any type of apparatus, such as gas burners, electric heaters, welding apparatus, lasers and etc., so long as the heating apparatus has the capability to apply sufficient heat to achieve the minimum pressure increase limit. However, the heating apparatus must be used in such as way so as to apply a generally even heating. Proper heating may be achieved using a standard acetylene torch 16 with a conventional rose-bud tip to diffuse the flame from the torch. Using a circular motion, the torch is applied to the convexly warped side of the head 10 for even heating of the head's mid-section. In this regard, torch or torches mounted in a stationary position generally would not be suitable for carrying out the present invention, absent further steps taken to ensure even heating.

Thereafter, the method of the present invention includes rapidly cooling the heated section of the head 10 as shown in FIG. 2C. Rapid cooling preferably includes directing a flow of fluid (preferably air) across the heated section of the head 10. Rapid cooling continues until the pressure decreases between the press 12 and the head to approximately the amount of pressure applied prior to heating.

A squirrel cage blower 18, powered by a 5 hp motor, has been found suitable for achieving the requisite rapid cooling. Other techniques may be used to achieve rapid cooling as well, for instance contacting the head with a cold material (e.g. ice, receptacles containing ice, tubes through which a coolant flows, such as water or other coolant), or directing a liquid across the head, such as water or other liquid, and etc.

Following the rapid cooling step, the press 12 is adjusted to reduce the pressure applied to the head 10 by approximately 5% to 20%, and most preferably approximately 14%, from the pressure initially applied to the head as shown in FIG. 2D. Thus, if the press 12 initially applied a pressure of 7,000 pounds to the head 10, this step most preferably reduces the pressure to approximately 6,000 pounds. The press 12 maintains this decreased pressure until the head 10 has cooled to substantially ambient temperature.

Thereafter, the head 10 is measured to determine if warpage has been reduced to an acceptable level. Warpage may be measured by laying a straight edge along the top or bottom of the head 10, and measuring the deviation of the head from the straight edge. Preferably, the straight edge is laid along the concave side of the warpage (the side of the head opposite from which heat was applied), and the maximum deviation from the head surface is measured using a feeler gauge. As mentioned earlier, vertical orientation of the head 10 in the press 12 facilitates access to both sides of the head.

If the head 10 still includes an unacceptable amount of warpage, the method includes repeating the foregoing steps for a section of the head near the head's upper end, rather than the head's mid-section. Next, if the head 10 still has too much warpage, the method includes repeating the procedure for a section of the head near the head's lower end. Usually, after application of this procedure to the mid, upper, and lower head sections, the head 10 will deviate no more than ±0.006 inches from being straight. However, if the warpage is still not acceptable, the method includes repeating the entire procedure, i.e., for the mid-section of the head, the upper head section, and lower head section, as necessary until head warpage has been reduced to a satisfactory level.

The method as described has been found to be effective in substantially reducing warp in cylinder heads. While not known for certain why the method works, one can speculate. Most likely, the heating softens the metal. Thereafter, the rapid cooling in conjunction with the applied pressure causes the heated portion of the head to contract more than other head portions, which is the convexly warped side of the head, and thereby reduces warpage.

While a preferred embodiment of the invention has been illustrated and described, it will be appreciated that various changes can be made therein while remaining within the scope of the invention. For example, a horizontal press could be used. While this would not allow convenient access to both sides of the head, the method still could be carried out, albeit with more difficulty. Since changes can be made to the described embodiments of the invention, the invention should be defined only reference to claims to the invention.

The embodiments of the invention in which an exclusive property or privilege is claimed are defined as follows:

1. A method for straightening a warped cylinder head, the method comprising the steps of:
   (a) placing the cylinder head in a press;
   (b) applying a first pressure to the cylinder head with the press;
   (c) heating the cylinder head until the pressure applied to the cylinder head increases to a second pressure, greater than the first pressure, due to thermal expansion of the cylinder head;

(d) cooling the cylinder head until the pressure applied to the cylinder head with the press has been reduced to a third pressure less than the second pressure, the cooling acting to reduce the pressure by decreasing thermal expansion of the cylinder head caused by the step of heating; and (e) operating the press to reduce pressure applied to the cylinder head to a fourth pressure, less than the first pressure.

2. The method of claim 1, further comprising the steps of:

(a) maintaining the cylinder head at approximately the fourth pressure, while allowing the cylinder head to cool to ambient temperature; and (b) removing the cylinder head from the press after the cylinder head has cooled to ambient temperature.

3. The method of claim 1, wherein the third pressure is approximately equal to the first pressure.

4. The method of claim 1, wherein the step of cooling the cylinder head is performed by directing a fluid across the cylinder head.

5. The method of claim 1, wherein the cylinder head includes a concavely curved side, and an opposite, convexly curved side, the curvature in the sides of the cylinder head being due to warp, wherein the step of heating the cylinder head includes directing heat only towards the convexly curved side of the cylinder head.

6. The method of claim 1, wherein the second pressure is no more than 14% greater than the first pressure.

7. The method of claim 1, wherein the fourth pressure is at least 5% less than the first pressure.

8. A method for straightening a warped cylinder head, the cylinder head including a concavely curved side, and an opposite, convexly curved side, the curvature in the sides of the cylinder head being due to warp, the method comprising the steps of:

(a) placing the cylinder head in a press;

(b) applying a first pressure to the cylinder head with the press;

(c) directing heat only towards the convexly curved side of the cylinder head, until the pressure applied to the cylinder head increases to a second pressure, at least 5% greater than the first pressure, due to thermal expansion of the cylinder head; and (d) cooling the cylinder head to ambient temperature.

9. The method of claim 8, wherein the step of cooling the cylinder head includes directing a fluid across the cylinder head for causing cooling, the fluid being directed across the cylinder head until the pressure applied to the cylinder head has been reduced to a third pressure less than the second pressure, the cooling acting to reduce the pressure by decreasing thermal expansion of the cylinder head caused by the step of heating.

10. The method of claim 9, wherein the third pressure is approximately equal to the first pressure.

11. The method of claim 8, wherein the step of cooling the cylinder head includes maintaining the cylinder head at a pressure less than the first pressure, until the cylinder head has cooled to ambient temperature.

12. The method of claim 11, wherein the cylinder head is maintained at a pressure no less than 80% of the first pressure, until the cylinder head has cooled to ambient temperature.

13. The method of claim 8, wherein the cylinder head includes a longitudinal axis, and wherein the step of placing the cylinder head in a press includes orienting the cylinder head with its longitudinal axis substantially vertical.

14. A method for straightening a warped cylinder head, the method comprising the steps of:

(a) placing the cylinder head in a press;

(b) applying a first pressure to the cylinder head with the press;

(c) heating the cylinder head to increase the pressure being applied to the cylinder head to a second pressure, greater than the first pressure, due to thermal expansion of the cylinder head;

(d) cooling the cylinder head until the pressure applied to the cylinder head reduces to a third pressure, less than the second pressure, due to a decrease in thermal expansion of the cylinder head from cooling;

(e) operating the press to maintain the cylinder head at a pressure less than the third pressure, but being at least 80% of the first pressure, until the cylinder head cools to substantially ambient temperature, and (f) removing the cylinder head from the press.

15. The method of claim 14, wherein the step of cooling the cylinder head, includes directing a fluid across the cylinder head.

16. The method of claim 14, wherein the second pressure is no more than 14% greater than the first pressure.

17. The method of claim 14, wherein the cylinder head includes a concavely curved side, and an opposite, convexly curved side, and the step of heating includes directing heat only towards the convexly curved side of the cylinder head.

18. The method of claim 14, wherein the fourth pressure is at least 5% less than the first pressure.

* * * * *